United States Patent [19]
Takahashi

[11] Patent Number: 5,239,950
[45] Date of Patent: Aug. 31, 1993

[54] 2-CYCLE ENGINE

[75] Inventor: Masanori Takahashi, Hamamatsu, Japan

[73] Assignee: Sanshin Kogyo Kabushiki Kaisha, Hamamatsu, Japan

[21] Appl. No.: 966,286

[22] Filed: Oct. 26, 1992

[30] Foreign Application Priority Data

Nov. 2, 1991 [JP] Japan .................. 3-315319

[51] Int. Cl.⁵ ............................. F02B 33/00
[52] U.S. Cl. ..................... 123/65 BA; 123/65 R; 123/65 P
[58] Field of Search .............. 123/65 BA, 65 P, 65 R, 123/73 C

[56] References Cited

U.S. PATENT DOCUMENTS

| | | |
|---|---|---|
| 2,367,565 | 1/1945 | Curtis . |
| 2,645,214 | 7/1953 | Birnstiel . |
| 2,744,506 | 5/1956 | Reynolds . |
| 2,775,470 | 12/1956 | Bixler et al. ............ 123/65 BA |
| 2,787,987 | 4/1957 | Portman . |
| 2,820,339 | 1/1958 | Grieshaber et al. . |
| 2,887,993 | 5/1959 | Shallenberg ............ 123/65 BA |
| 3,077,189 | 2/1963 | Earnshaw et al. ........ 123/65 BA |
| 4,254,752 | 3/1981 | Friddell et al. . |
| 4,907,549 | 3/1990 | Morikawa et al. ......... 123/65 BA |
| 5,143,028 | 9/1992 | Takahashi .............. 123/65 BA |
| 5,146,899 | 9/1992 | Tanaka et al. ........... 123/73 C |

FOREIGN PATENT DOCUMENTS 842238  5/1952  Fed. Rep. of Germany .
2-76126 11/1988  Japan .

Primary Examiner—E. Rollins Cross
Assistant Examiner—M. Macy
Attorney, Agent, or Firm—Ernest A. Beutler

[57] ABSTRACT

A number of embodiments of outboard motors embodying pressure scavenged 2-cycle internal combustion engines. In each embodiment, a plenum chamber serves the scavenge passages of the engine and the pressure relief for a scavenge pump is provided by a pressure relief valve in the plenum chamber so as to reduce the opening and closing of the pressure relief valve due to pulsations caused by the engine operation. In one embodiment, the pressure is relieved by discharging the air to the exhaust system for silencing and also for cooling the exhaust gases. In other embodiments, the air for pressure relief is discharged to the atmosphere.

30 Claims, 5 Drawing Sheets

2-CYCLE ENGINE

BACKGROUND OF THE INVENTION

This invention relates to a 2-cycle engine and more particularly to an improved scavenging system for such an engine and to a scavenge pump and pressure relief system.

The advantages of supercharging an internal combustion engine so as to improve its performance are well known. Supercharging has particular advantages with 2-cycle engines because it permits better scavenging of the engine and also permits the intake air charge to be directed into the cylinder without having to pass first through the crankcase for normal compression. The advantage of not having the charge pass through the crankcase is that this insures that lubricant from the crankcase will not be discharged through the exhaust of the engine.

In conjunction with supercharging, however, it is desirable to limit the maximum pressure which is exerted in the combustion chamber by the intake charge. Because most internal combustion engines run over a widely varying speed and load range and in order to achieve adequate pressure at lower speed ranges, the pressure output of the pump at higher engine speeds may be greater than that desirable to insure good engine performance. Therefore, it is desirable to provide some form of pressure relief to insure that the maximum pressure in the induction system does not reach too high a value.

Conventionally, it has been the practice to provide a pressure relief valve directly at the output of the supercharger. However, the pressure at the output of the supercharger may vary cyclically and this can cause the pressure relief valve to open and close at times when pressure relief is not actually necessary.

It is, therefore, a principal object of this invention to provide an improved pressure relief system for a supercharger for an internal combustion engine.

It is a further object of this invention to provide an improved scavenging system for a 2-cycle engine embodying a scavenge pump and pressure relief system for it.

In conjunction with the control of pressure in a supercharged engine, the pressure is normally controlled by dumping excess air into the atmosphere at the outlet of the supercharger. When this is done, however, considerable noise is generated and also the air may be discharged in an area where air discharge may be undesirable for a variety of reasons.

It is, therefore, a still further object of this invention to provide an improved pressure relief valve for a supercharged engine wherein the air discharge from pressure relief will be discharged to an area where noise cannot be generated or the noise generation will be minimized.

SUMMARY OF THE INVENTION

A first feature of this invention is adapted to be embodied in an internal combustion engine having a combustion chamber defined at least in part by a pair of relatively moveable components. A scavenge port communicates with the combustion chamber and is opened and closed by the relative movement of the components. A plenum chamber communicates with the scavenge port and an air compressor is provided which receives atmospheric air and delivers a compressed charge to the plenum chamber for admission to the combustion chamber upon opening of the scavenge port. A pressure relief valve is provided in the plenum chamber for limiting the maximum pressure in the plenum chamber.

Another feature of the invention is also adapted to be embodied in an internal combustion engine having a combustion chamber defined by a pair of relatively moveable components. A compressor is provided for delivering a compressed charge to the combustion chamber and an exhaust system is incorporated for discharging the exhaust gases from the combustion chamber to the atmosphere. A pressure relief valve is provided between the compressor and the combustion chamber for controlling the maximum pressure exerted by dumping excess air. This excess air that is dumped for pressure control is discharged into the exhaust system for silencing and cooling purposes.

DETAILED DESCRIPTION OF THE PREFERRED EMBODIMENTS

Figure 1:
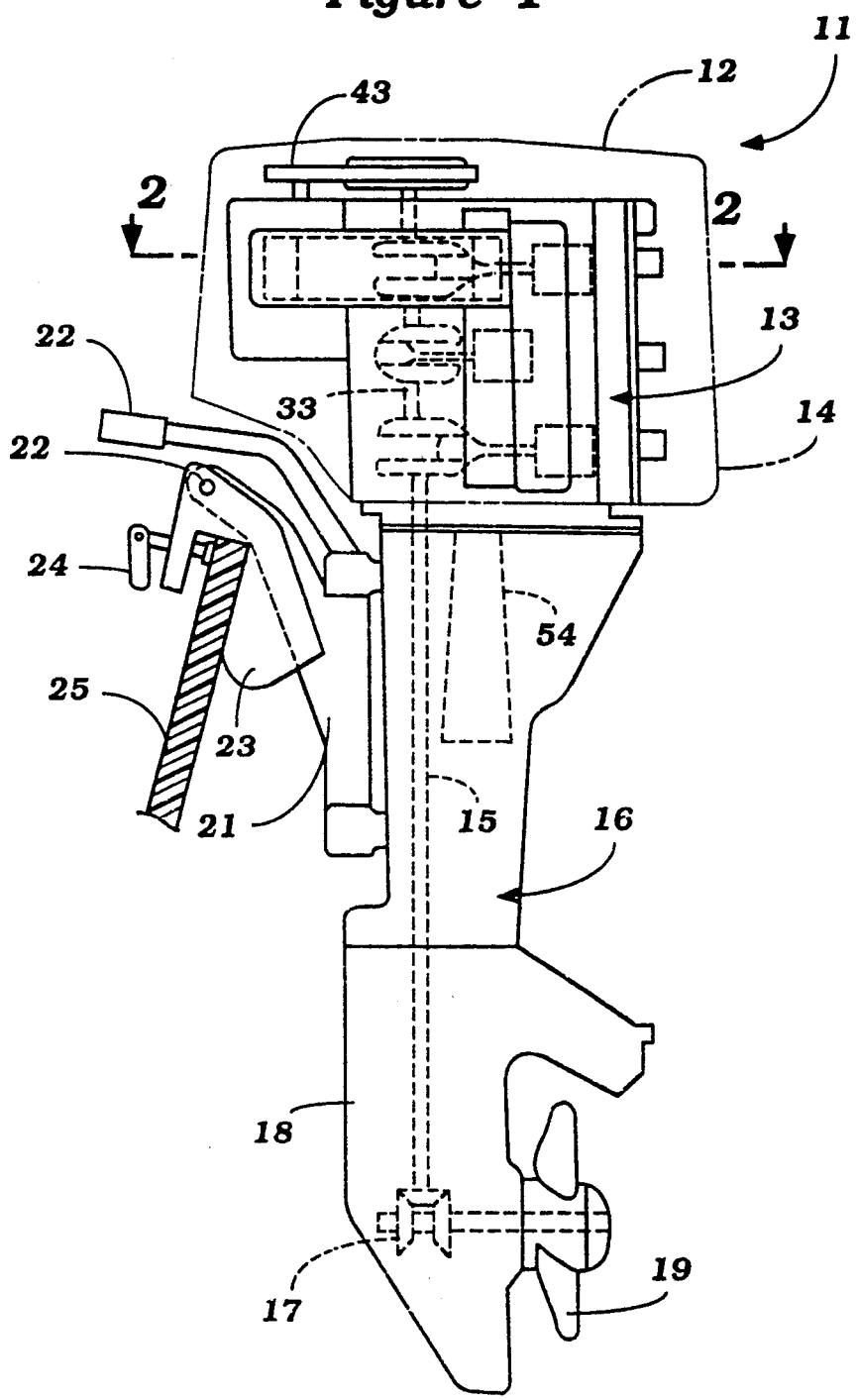
FIG. 1 is a side elevational view of an outboard motor constructed in accordance with an embodiment of the invention as attached to the transom of an associated watercraft, shown partially and in cross section.

Referring now in detail to the drawings and first to the embodiment of FIGS. 1 through 4 and initially primarily to FIG. 1, an outboard motor constructed in accordance with an embodiment of the invention is identified generally by the reference numeral 11. The invention is described in conjunction with an outboard motor for exemplary purposes because the invention has particular utility with 2-cycle internal combustion engines and such engines are normally employed as the power plant for outboard motors. It should be readily apparent to those skilled in the art that the invention may be employed in conjunction with other applications for internal combustion engines and that certain facets of the invention also may be employed with other types of engines than 2-cycle engines.

The outboard motor 11 includes a power head, indicated generally by the reference numeral 12 and which is comprised on an internal combustion engine 13 and a surrounding protective cowling 14. The engine 13, which has a construction which will be described in more detail later by reference to FIGS. 2 through 3, has an output shaft which drives a driveshaft 15 that is rotatably journaled within a driveshaft housing 16 which depends from the power head 12. This driveshaft 15 then drives a forward/neutral/reverse transmission 17 contained within a lower unit 18 for driving a propeller 19 and selected forward and reverse directions.

A steering shaft (not shown) is affixed to the driveshaft housing 16 and is journaled for steering movement about a generally vertically extending steering axis within a swivel bracket 21. A tiller 22 is affixed to the upper end of the steering shaft for steering of the outboard motor 11 in a well known manner.

The swivel bracket 21 is pivotally connected by means of a pivot pin 22 to a clamping bracket 23 for trim adjustment of the outboard motor 11 about the axis of the pivot pin 22 and for tilting up of the outboard motor 11 to an out of the water position, as is well known in the outboard motor art. A clamp 24 is carried by the clamping bracket 23 for detachably connecting the outboard motor 11 to a transom 25 of an associated watercraft.

Figure 2:
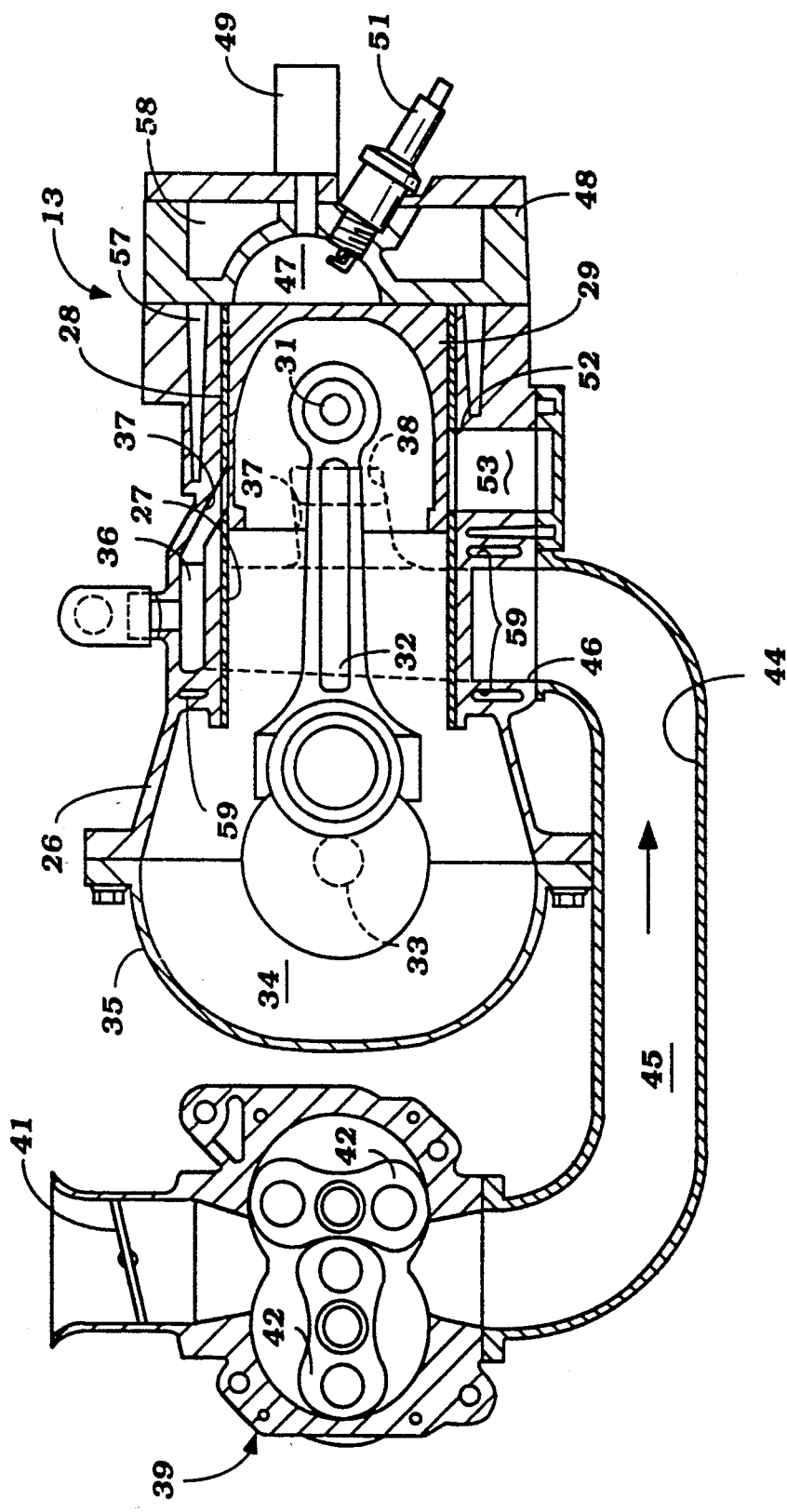
FIG. 2 is an enlarged cross sectional view taken along the line 2—2 of FIG. 1.
Figure 3:
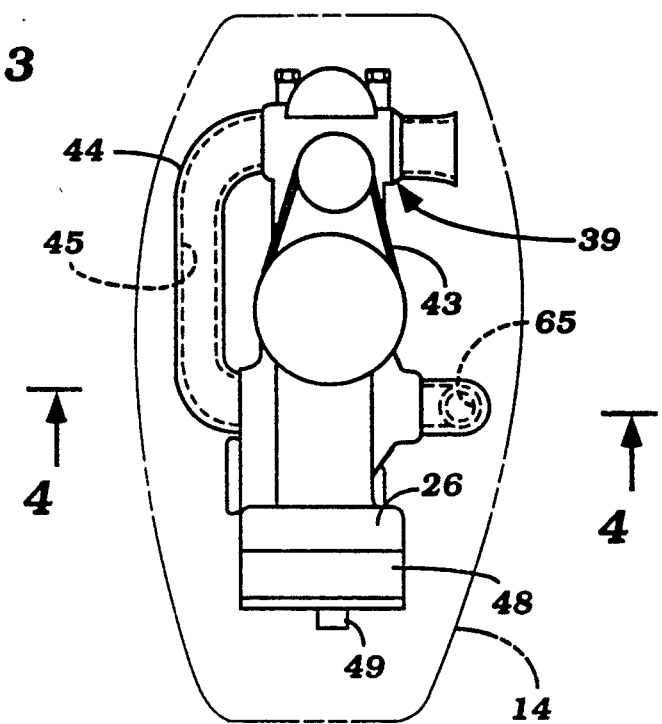
FIG. 3 is a top plan view of the power head of the outboard motor with a protective cowling shown in phantom.
Figure 4:
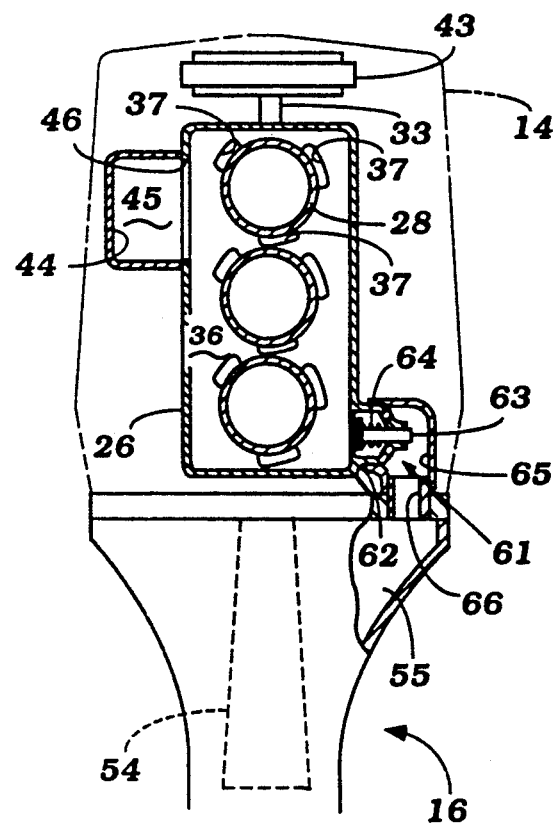
FIG. 4 is a cross sectional view taken along the line 4—4 of FIG. 3.

Referring now in detail additionally o FIGS. 2 through 4, the engine 13 in the illustrated embodiment is of the three cylinder inline type and includes a cylinder block 26 in which three aligned cylinder bores 27 are formed by pressed or cast in cylinder liners 28. As is typical with outboard motor practice, the axes of the cylinder bores 27 extend generally horizontally.

Pistons 29 reciprocate in each of the cylinder bores 27 and are connected by means of piston pins 31 to the small end of respective connecting rods 32. The big end of the connecting rods 32 are connected to the throws of a crankshaft 33 which is rotatably supported about a vertically extending axis in a suitable manner. The crankshaft 33 is rotatably journaled in a crankcase chamber 34 formed by a skirt portion of the cylinder block 26 and crankcase member 35 which is affixed to the cylinder block 26 in any known manner. Because of the scavenging system which will be described, the crankcase chambers 34 may contain only a small amount of lubricant for lubricating the various components contained therein since the intake charge does not pass through these chambers. This will also insure that excess lubricant cannot be present in the exhaust gases of the engine.

A plenum chamber 36 (FIGS. 2 and 4) is formed in the cylinder block 26 around the lower portion of the cylinder liners 28 and has a fairly substantial volume. A plurality of scavenge passages 37 extend from this plenum chamber 36 around each cylinder bore 27 and terminate in scavenge ports 38 which are opened and closed as the pistons 29 reciprocate. The scavenge passages 37 and scavenge ports 38 are configured so as to provide a Schnurle type of scavenging flow within the combustion chamber, to be described.

A scavenge air charge is drawn for the plenum chamber 36 from the area within the protective cowling 14 by a scavenge pump, indicated generally by the reference numeral 39. A throttle valve 41 is provided in the intake passage for the scavenge pump 39 and will control the speed of the engine 13 in a well known manner. In the illustrated embodiment, the scavenge pump 39 is a Roots type compressor or supercharger having a pair of intermeshing rotors 42 which are driven in timed relationship with the crankshaft 33 by means of a belt drive 43. The scavenge pump 39 delivers the pressurized charge to a scavenge manifold 44 which has an internal passageway 45 that communicates with an inlet opening 46 formed in one side of the cylinder block 26 and which registers with the plenum chamber 36.

The compressed air charge which has been delivered to the plenum chamber 36 will be transferred into the combustion chamber when the piston 29 moves downwardly to open the scavenge ports 38. This combustion chamber is formed in part by a recess 47 formed by a cylinder head assembly 48 that is affixed to the cylinder block 26 in any appropriate manner. The remainder of the combustion chamber is formed by the head of the piston 29 and the cylinder bore 27, as is well known in this art.

A fuel charge is sprayed into the combustion chamber by a fuel injector 49 that is mounted in the cylinder head 48 in an appropriate manner. The fuel injector 49 may be of any known type and, if desired, may also inject air under pressure.

The fuel air charge thus formed in the combustion chamber is then fired by means of spark plugs 51 that are mounted in the cylinder head 48. This burning charge then drives the piston 29 downwardly.

An exhaust port 52 is formed in each cylinder liner 28 and communicates with an exhaust manifold 53 formed integrally within the cylinder block 26. This exhaust manifold communicates with an exhaust pipe 54 (FIGS. 1 and 4) which depends into the driveshaft housing 16. An expansion chamber 55 is formed in the driveshaft housing 16 and the exhaust gases are then discharged from the expansion chamber 55 through a suitable discharge, such as through the propeller underwater discharge. In addition, a restricted above the water exhaust discharge (not shown) may also be incorporated for exhausting the gases when the engine is running at low speeds and the propeller 19 is relatively deeply submerged, as is well known in this art.

The engine 13 is water cooled and the cylinder block 26 and cylinder 48 are formed with appropriate cooling jackets 57 and 58, respectively, through which water is circulated for cooling purposes. In addition, a cooling jacket 59 is formed in the lower portion of the cylinder block 26 and encircles the plenum chamber 36 so as to cool the intake charge and improve volumetric efficiency.

As is well known, the output of the scavenge pump 39 or supercharger varies with engine speed and depending upon the type of supercharger employed this variation may not be linear. In order to achiever greater boost at lower speeds, the supercharger 39 is usually driven at a fairly high speed ratio and this generates excess pressure from that required for good engine operation when the engine is operating at high speed. In order to prevent this high pressure from being exerted in the combustion chamber 47 and deteriorating engine performance, there is provided a pressure relief valve, indicated generally by the reference numeral 61 and which pressure relief valve 61 communicates directly with the plenum chamber 36 so that the individual pulses generated in the induction system will be dampened and to avoid pressure relief under stages when the average pressure does not require it.

For this purpose, the pressure relief valve 61 is provided with an inlet port 62 which communicates with the plenum chamber 36 at a point well spaced from the inlet opening 46 that communicates the scavenge manifold 41 with the plenum chamber 36. A valve element 63 is normally biased by a coil compression spring 64 into a closed position. When the pressure exceeds that of the preload of the spring 64, the valve element 63 will open and the compressed air charge may flow through opening 62 into an "L" shaped conduit 65 which, in this embodiment, communicates with a passageway 66 that extends into the expansion chamber 55 of the driveshaft housing. As a result, when the valve 61 opens the air discharged will not be discharged directly into the atmosphere but will be discharged into the expansion chamber 56 so that noise of the discharged air will be well muffled. In addition, this air, which is discharged at high speed conditions, will help cool the exhaust gases in the expansion chamber 55 and provide additional silencing therefore.

Figure 5:
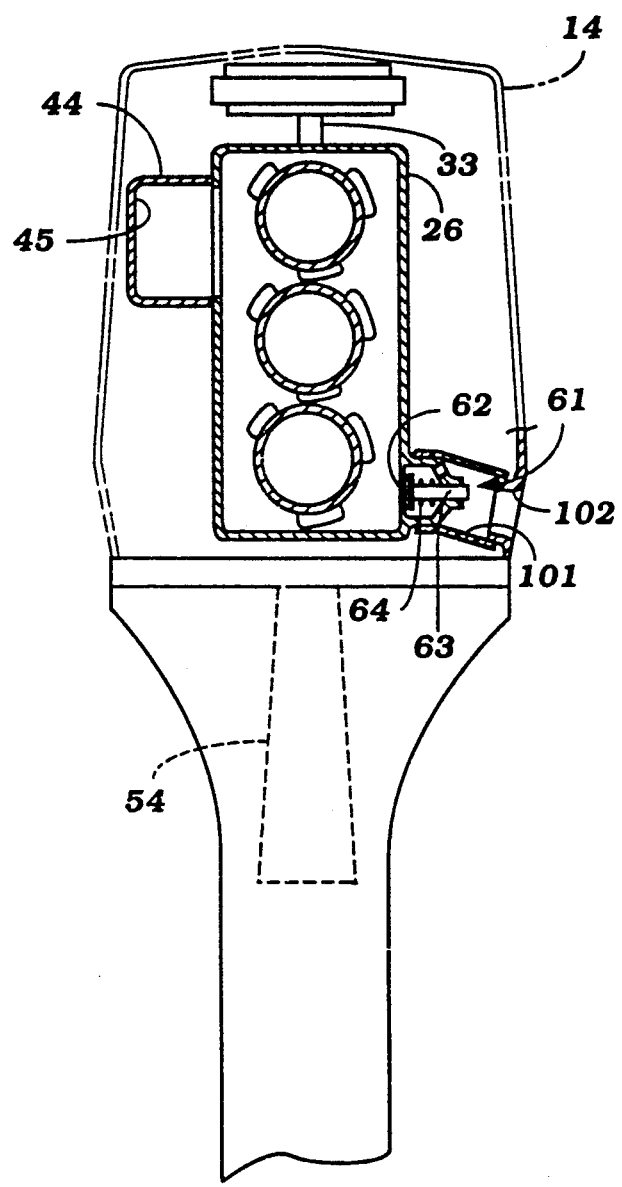
FIG. 5 is a cross sectional view, in part similar to FIG. 4, and shows another embodiment of the invention.

FIG. 5 shows another embodiment of the invention which is generally the same as the embodiment thus far described and differs from it only in the way in which the pressurized air is relieved from the plenum chamber 36 for pressure control. For that reason, components of this embodiment which are the same as the previously described embodiment have been identified by the same reference numerals and will be described again only insofar as is necessary to understand the construction and operation of this embodiment.

In this embodiment, the pressure relief valve 61 communicates with a flexible conduit 101 which, in turn, delivers the excess air being dumped to a discharge opening 102 formed directly in the protective cowling 14. As a result, in this embodiment the air dumped for pressure relief will be discharged directly to the atmosphere.

Figure 6:
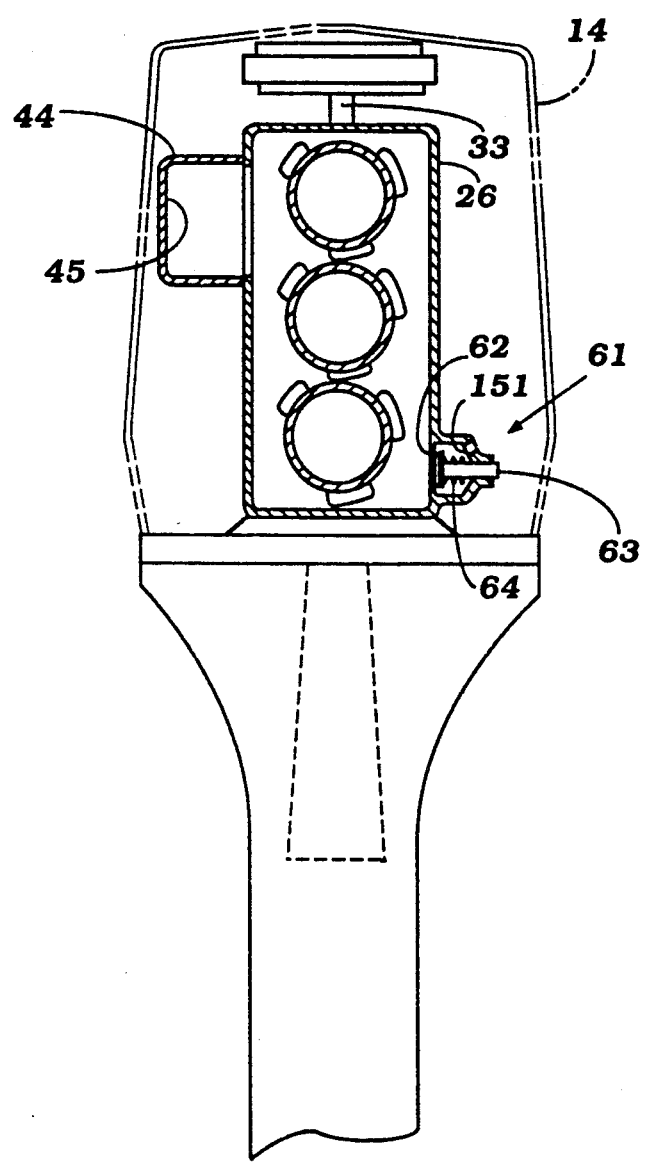
FIG. 6 is a cross sectional view, in part similar to FIGS. 4 and 5, and shows another embodiment of the invention.

FIG. 6 shows another embodiment of the invention which, like the embodiment of FIG. 5, differs from the embodiment of FIGS. 1 through 4 only in the area to which the pressure is dumped for maintaining pressure relief. For that reason, components of this embodiment which are the same as previously described have again been identified by the same reference numerals and will be described again only insofar as is necessary to understand the construction and operation of this embodiment. In this embodiment, the pressure relief valve 61 is formed with one or more openings 151 which communicate directly with the interior of the protective cowling 14. As a result, the pressurized air that is dumped will be discharged internally of the protective cowling 14 and thus there will be silencing of this air from the occupants of the associated watercraft.

It should be readily apparent from the foregoing descriptions that the embodiments of the invention are particularly useful in providing good pressure relief for a scavenging system without added noise or without the likelihood of pulsations in the pressure causing unnecessary pressure relief. In addition, the arrangement has an embodiment that provides some silencing for the exhaust gases and also silencing of the discharged air through its introduction into the exhaust system. Of course, the foregoing description is that of preferred embodiments of the invention and various changes and modifications may be made without departing from the spirit and scope of the invention, as defined by the appended claims.

I claim:

1. An internal combustion engine comprising a combustion chamber defined by at least a pair of relatively moveable components, a scavenging port communicating with said combustion chamber and opened and closed by the relative movement of said components, a plenum chamber communicating with said scavenge port, an air compressor for receiving atmospheric air and delivering a compressed charge to said plenum chamber for admission to said combustion chamber upon opening and closing of said scavenge port, and a pressure relief valve in said plenum chamber for limiting the maximum pressure in said plenum chamber.

2. An internal combustion engine as set forth in claim 1 wherein the engine comprises a reciprocative engine and the components comprise a cylinder and a piston.

3. An internal combustion engine as set forth in claim 2 wherein the plenum chamber surrounds at least in part the cylinder.

4. An internal combustion engine as set forth in claim 3 wherein the engine has multiple combustion chambers and multiple scavenge ports, each combustion chamber being formed by a respective cylinder and a plenum chamber serves all of the scavenge ports and wherein the air compressor supplies air to the plenum chamber through a common inlet opening.

5. An internal combustion engine as set forth in claim 4 wherein the pressure relief valve is positioned at a place in the plenum chamber spaced from the inlet opening.

6. An internal combustion engine as set forth in claim 4 wherein there is a common plenum chamber for all cylinders.

7. An internal combustion engine as set forth in claim 6 wherein the pressure relief valve is positioned at a place in the plenum chamber spaced from the inlet opening.

8. An internal combustion engine as set forth in claim 1 further including an exhaust port for discharging exhaust gases from the combustion chamber and an exhaust system for discharging the exhaust gases from the exhaust port to the atmosphere.

9. An internal combustion engine as set forth in claim 8 wherein the pressure relief valve relieves pressure by discharging air into the exhaust system.

10. An internal combustion engine as set forth in claim 8 wherein the pressure relief valve relieves pressure by discharging air to the atmosphere.

11. An internal combustion engine as set forth in claim 1 wherein the engine forms a portion of the power head of an outboard motor.

12. An internal combustion engine as set forth in claim 11 wherein the engine comprises a reciprocative engine and the components comprise a cylinder and a piston.

13. An internal combustion engine as set forth in claim 12 wherein the plenum chamber surrounds at least in part the cylinder.

14. An internal combustion engine as set forth in claim 13 wherein the engine has multiple combustion chambers and multiple scavenge ports each combustion chamber being formed by a respective cylinder and wherein a plenum chamber serves all of the scavenge ports and wherein the air compressor supplies air to the plenum chamber through a common inlet opening.

15. An internal combustion engine as set forth in claim 14 wherein the pressure relief valve is positioned at a place in the plenum chamber spaced from the inlet opening.

16. An internal combustion engine as set forth in claim 14 wherein there is a common plenum chamber for all cylinders.

17. An internal combustion engine as set forth in claim 16 wherein the pressure relief valve is positioned at a place in the plenum chamber spaced from the inlet opening.

18. An internal combustion engine as set forth in claim 11 further including an exhaust port for discharging exhaust gases from the combustion chamber and an exhaust system for discharging the exhaust gases from the exhaust port to the atmosphere.

19. An internal combustion engine as set forth in claim 18 wherein the pressure relief valve relieves pressure by discharging air into the exhaust system.

20. An internal combustion engine as set forth in claim 19 wherein the outboard motor further includes a driveshaft housing defining an expansion chamber which forms a portion of the exhaust system and the air is discharged into the expansion chamber.

21. An internal combustion engine as set forth in claim 18 wherein the pressure relief valve relieves pressure by discharging air to the atmosphere.

22. An internal combustion engine as set forth in claim 21 wherein the power head further includes a protective cowling surrounding the engine and wherein the pressure relief valve discharges air into the interior of the protective cowling.

23. An internal combustion engine as set forth in claim 21 wherein the power head further includes a protective cowling surrounding the internal combustion engine and the relief valve communicates with the atmosphere through a conduit extending within the protective cowling to a discharge opening formed in the protective cowling.

24. An internal combustion engine comprising a combustion chamber defined by at least a pair of relatively moveable components, and intake port communicating with said combustion chamber, an air compressor for delivering a compressed air charge to said intake port, an exhaust port for discharging exhaust gases from said combustion chamber, an exhaust system for receiving exhaust gases from said exhaust port and discharging them to the atmosphere, a pressure relief valve for relieving the pressure in said intake port, and means for communicating the air relieved from said intake port by said pressure relief valve to said exhaust system.

25. An internal combustion engine as set forth in claim 24 wherein the engine comprises a reciprocative engine and the components comprise a cylinder and a piston.

26. An internal combustion engine as set forth in claim 25 wherein a plenum chamber surrounds at least in part the cylinder and the supercharger delivers air to the penum chamber.

27. An internal combustion engine as set forth in claim 26 wherein the engine has multiple combustion chambers and multiple intake ports, each combustion chamber being formed by a respective cylinder and wherein a common plenum chamber serves all of the intake ports and wherein the air compressor supplies air to the plenum chamber through a common opening.

28. An internal combustion engine as set forth in claim 24 wherein the engine forms a portion of the power head of an outboard motor.

29. An internal combustion engine as set forth in claim 28 wherein the engine comprises a reciprocative engine and the components comprise a cylinder and a piston.

30. An internal combustion engine as set forth in claim 28 wherein the outboard motor further includes a driveshaft housing defining an expansion chamber which forms a portion of the exhaust system and the air is discharged into the expansion chamber.

* * * * *

UNITED STATES PATENT AND TRADEMARK OFFICE
CERTIFICATE OF CORRECTION

PATENT NO. : 5,239,950
DATED : August 31, 1993
INVENTOR(S) : Masanori Takahashi

It is certified that error appears in the above-indentified patent and that said Letters Patent is hereby corrected as shown below:

Column 5, line 68, Claim 1, after "pressure" insert --generated by said air compressor--.

Signed and Sealed this

Thirtieth Day of August, 1994

Attest:

BRUCE LEHMAN

Attesting Officer     Commissioner of Patents and Trademarks